United States Patent
Kliewer et al.

(10) Patent No.: US 12,420,632 B2
(45) Date of Patent: Sep. 23, 2025

(54) ALL-WHEEL DRIVE SYSTEM FOR ELECTRIC VEHICLE

(71) Applicant: GM GLOBAL TECHNOLOGY OPERATIONS LLC, Detroit, MI (US)

(72) Inventors: Joseph Kliewer, Bloomfield Hills, MI (US); Alan G. Holmes, Clarkston, MI (US); James B. Borgerson, Clarkston, MI (US); Brenten Paul Corliss, Royal Oak, MI (US); Daryl A. Wilton, Macomb, MI (US); Giles D. Bryer, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 135 days.

(21) Appl. No.: 18/500,036

(22) Filed: Nov. 1, 2023

(65) Prior Publication Data

US 2025/0135878 A1 May 1, 2025

(51) Int. Cl.
*B60K 7/00* (2006.01)
*B60K 1/00* (2006.01)
(Continued)

(52) U.S. Cl.
CPC ............ *B60K 23/0808* (2013.01); *B60K 1/00* (2013.01); *B60K 2007/0061* (2013.01); *B60K 17/348* (2013.01)

(58) Field of Classification Search
CPC .... B60K 23/0808; B60K 1/00; B60K 17/348; B60K 2007/0061; B60K 2001/001
See application file for complete search history.

(56) References Cited

U.S. PATENT DOCUMENTS

| | | | |
|---|---|---|---|
| 6,719,660 B2 * | 4/2004 | Palazzolo | B60K 17/346 475/221 |
| 8,961,353 B2 * | 2/2015 | Valente | B60K 17/3467 475/225 |

(Continued)

FOREIGN PATENT DOCUMENTS

JP 2010184577 A * 8/2010

OTHER PUBLICATIONS

Mueller, J. (May 24, 2023). CTI Symposium. Electric Driveline Technology for Mercedes-AMG GT 63 S E Performance, conference paper, p. 5.

*Primary Examiner* — Justin Holmes
(74) *Attorney, Agent, or Firm* — Ingrassia Fisher & Lorenz, LLP | IF&L (57) ABSTRACT

An all-wheel drive system for a vehicle having a longitudinal axis includes an electric motor. The electric motor has an output shaft that extends along a first axis, and the first axis is substantially perpendicular to the longitudinal axis. The all-wheel drive system includes a first drive system including a first clutch and a first differential system configured to be coupled to a second drive system and to transfer torque to first wheels of the vehicle in a first state of the first clutch. The second drive system includes a second drive shaft and a second differential system. The second drive shaft is coupled to the output shaft and configured to transfer the torque to the second differential system. The second differential system is configured to transfer torque to second wheels of the vehicle, and the second differential system extends along a second axis substantially parallel to the first axis.

20 Claims, 4 Drawing Sheets

(51) Int. Cl.
   *B60K 23/08*   (2006.01)
   *B60K 17/348*  (2006.01)

(56) References Cited

U.S. PATENT DOCUMENTS

| | | |
|---|---|---|
| 9,079,495 B2 * | 7/2015 | Valente ................. B60K 17/35 |
| 10,920,859 B2 | 2/2021 | Conlon et al. |
| 10,982,745 B2 | 4/2021 | Holmes et al. |
| 2013/0260959 A1 * | 10/2013 | Quehenberger ............................ B60W 30/18172 477/36 |

* cited by examiner

ALL-WHEEL DRIVE SYSTEM FOR ELECTRIC VEHICLE

INTRODUCTION

The technical field generally relates to an all-wheel drive system for an electric vehicle, and more particularly relates to an all-wheel drive system for an electric vehicle having a transverse mounted electric motor.

Generally, vehicles include at least one drive system that transmits torque from a propulsion system to one or more wheels of the vehicle. In the example of an electric vehicle, the drive system transfers torque from an electric motor to the one or more wheels. Typically, the drive system employs one or more gears that are arranged to transfer the torque from the electric motor to the one or more wheels. In certain instances, the arrangement of the gears may result in the need for additional torque from the electric motor to drive the one or more wheels. The additional torque may decrease a range associated with the electric vehicle or may require the use of additional or larger capacity batteries to supply power to the electric motor.

Accordingly, it is desirable to provide an all-wheel drive system for an electric vehicle, which has improved efficiency to thereby increase a range of the electric vehicle or enable a reduction in capacity of the batteries associated with the electric vehicle. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is an all-wheel drive system for a vehicle having a longitudinal axis. The all-wheel drive system includes an electric motor configured to generate torque. The electric motor has an output shaft that extends along a first axis, and the first axis is substantially perpendicular to the longitudinal axis. The all-wheel drive system includes a first drive system including a first clutch and a first differential system configured to be coupled to a second drive system and to transfer the torque to first wheels of the vehicle in a first state of the first clutch. The all-wheel drive system includes the second drive system including a second drive shaft and a second differential system. The second drive shaft is coupled to the output shaft and configured to transfer the torque to the second differential system. The second differential system is configured to transfer the torque to second wheels of the vehicle, and the second differential system extends along a second axis substantially parallel to the first axis.

The second drive shaft is coupled to the output shaft via a planetary gear set. The planetary gear set includes a sun gear coupled to the output shaft, a plurality of planet gears coupled to a planet carrier and a ring gear, and the planet carrier is coupled to the second transfer shaft. The ring gear is coupled to a ring carrier and a brake, and the brake is configured to lock the ring gear relative to a motor housing associated with the electric motor. The ring carrier includes a bevel gear, the bevel gear is configured to couple to a first transfer pinion of a prop-shaft and the prop-shaft is configured to couple the second drive system to the first drive system. The second drive shaft extends along the first axis. The second drive shaft extends along a third axis, which is parallel to the first axis and the second axis. The output shaft is coupled to the second drive shaft by a gear that is arranged substantially perpendicular to the third axis. The second drive shaft is configured to be coupled to the first drive system via a second clutch. The second drive shaft defines a gear that is coupled to a ring gear of the second differential system. The first differential system includes a first differential ring gear and a differential housing that includes a plurality of spider gears that are configured to drive a pair of side gears, each side gear coupled to a respective first axle, and the first clutch is coupled to the first differential ring gear and is configured to connect the first differential ring gear with the differential housing in the first state. In a second state, the first clutch is configured to disconnect the first differential ring gear from the differential housing.

Also provided is a vehicle having a longitudinal axis. The vehicle includes an electric motor configured to generate torque. The electric motor has an output shaft that extends along a first axis, and the first axis is substantially perpendicular to the longitudinal axis. The vehicle includes a rear drive system including a rear drive shaft and a rear differential system. The rear drive shaft is coupled to the output shaft with a planetary gear set and configured to transfer the torque to the rear differential system. The rear differential system is configured to transfer the torque to rear wheels of the vehicle, and the rear differential system extends along a second axis substantially parallel to the first axis. The vehicle includes a front drive system including a front clutch and a front differential system configured to be coupled to the rear drive system and to transfer the torque to front wheels of the vehicle in a first state of the front clutch.

The planetary gear set includes a sun gear coupled to the output shaft, a plurality of planet gears coupled to a planet carrier and a ring gear, and the planet carrier is coupled to the rear transfer shaft. The ring gear is coupled to a ring carrier and a brake, and the brake is configured to lock the ring gear relative to a motor housing associated with the electric motor. The ring carrier includes a bevel gear, and the bevel gear is configured to couple to a first transfer pinion of a prop-shaft, and the prop-shaft is configured to couple the rear drive system to the front drive system. The rear drive shaft defines a gear that is coupled to a ring gear of the rear differential system. The front differential system includes a front differential ring gear and a differential housing that includes a plurality of spider gears that are configured to drive a pair of side gears, each side gear coupled to a respective front axle, and the front clutch is coupled to the front differential ring gear and is configured to connect the front differential ring gear with the differential housing in the first state. In a second state, the front clutch is configured to disconnect the front differential ring gear from the differential housing. The rear drive shaft extends along the first axis.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "about" denotes within 10% to account for manufacturing tolerances. In addition, the term "substantially" denotes within 10% to account for manufacturing tolerances.

Figure 1:
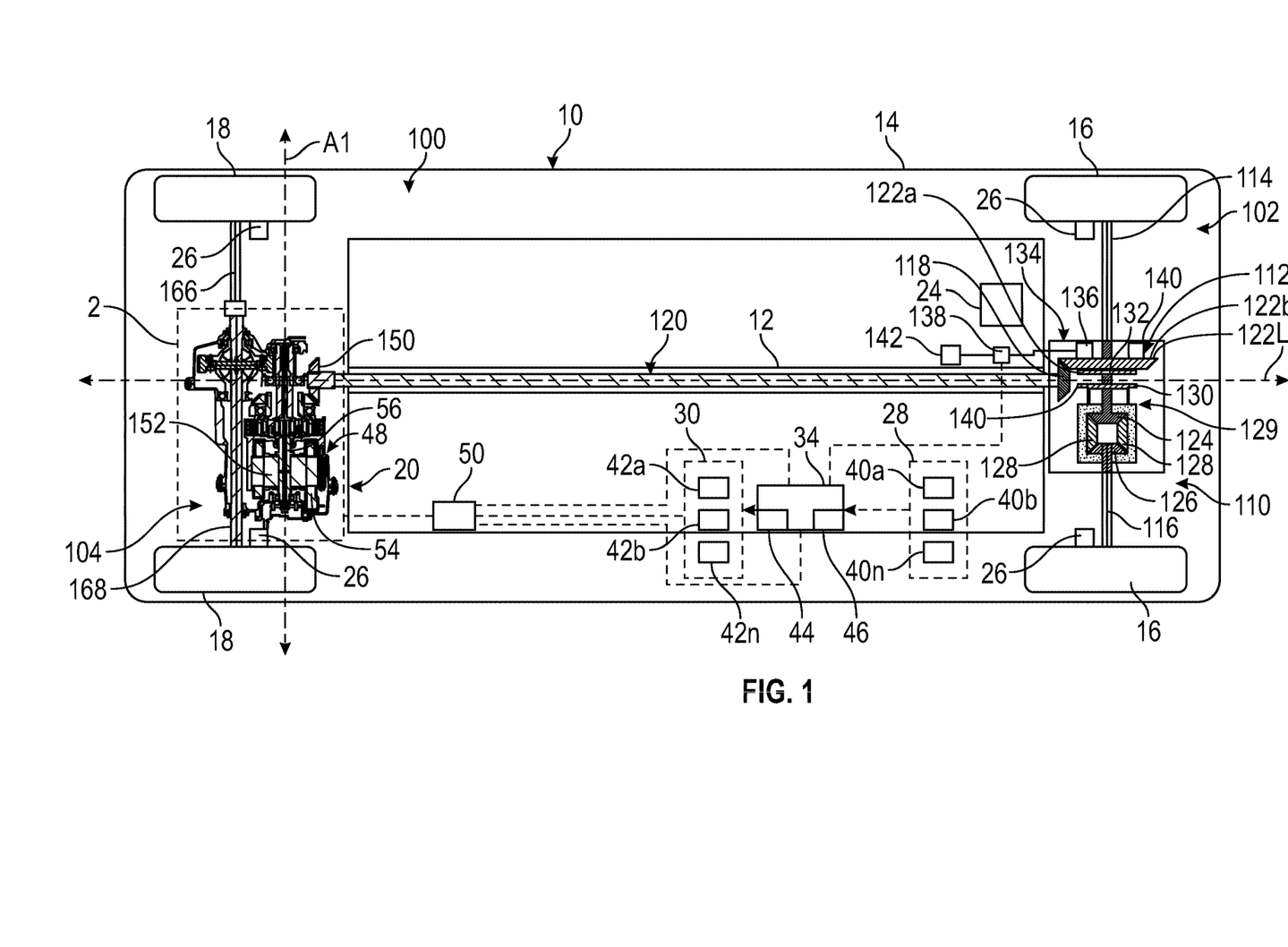
FIG. 1 is a schematic illustration of an electric vehicle including an all-wheel drive system in accordance with various embodiments.

With reference to FIG. 1, an all-wheel drive system shown generally as 100 is associated with a vehicle 10 in accordance with various embodiments. In one example, the vehicle 10 is an electric vehicle, however, it should be understood that the following disclosure may be applicable to other electric motor driven devices. As depicted in FIG. 1, the vehicle 10 generally includes a chassis 12, a body 14, first or front wheels 16, and second or rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the vehicle 10 is an autonomous vehicle or a semi-autonomous vehicle. As can be appreciated, the all-wheel drive system 100 can be implemented in other non-autonomous systems and is not limited to the present embodiments. The vehicle 10 is depicted in the illustrated embodiment as an electric passenger car, but it should be appreciated that any other vehicle, including trucks, sport utility vehicles (SUVs), recreational vehicles (RVs), etc., can also be used.

As shown, the vehicle 10 generally includes a propulsion system 20, the all-wheel drive system 100, a steering system 24, a brake system 26, a sensor system 28, an actuator system 30 and at least one controller 34. In this example, the propulsion system 20 is mounted proximate the rear wheels 18 so as to be located proximate a rear of the vehicle 10. In other embodiments, the propulsion system 20 may mounted proximate the front wheels 16 so as to be located proximate a front of the vehicle 10.

The brake system 26 is configured to provide braking torque to the wheels 16 and 18. Brake system 26 may, in various embodiments, include friction brakes, brake by wire, a regenerative braking system such as an electric machine, and/or other appropriate braking systems.

The steering system 24 influences a position of the wheels 16 and/or 18. The steering system 24 may include a steering wheel, however, in some embodiments contemplated within the scope of the present disclosure, the steering system may not include a steering wheel.

The sensor system 28 includes one or more sensing devices 40a-40n that sense observable conditions of the exterior environment and/or the interior environment of the vehicle 10. In various embodiments, the sensing devices 40a-40n include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter. The sensor system 28 is in communication with the controller 34 over a communication medium.

The actuator system 30 includes one or more actuator devices 42a-42n that control one or more vehicle features such as, but not limited to, the propulsion system 20, the steering system 24, and the brake system 26. In various embodiments, the vehicle 10 may also include interior and/or exterior vehicle features not illustrated in FIG. 1, such as various doors, a trunk, and cabin features such as air, music, lighting, touch-screen display components, active safety seat or haptic seat, and the like.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. The controller 34 may receive input, via a human-machine interface, such as the touchscreen display components, buttons, etc., to switch the all-wheel drive system 100 between all-wheel drive and two-wheel drive. Alternatively, the all-wheel drive system 100 may be switched between all-wheel drive and two-wheel drive manually, via operator input.

Figure 2:
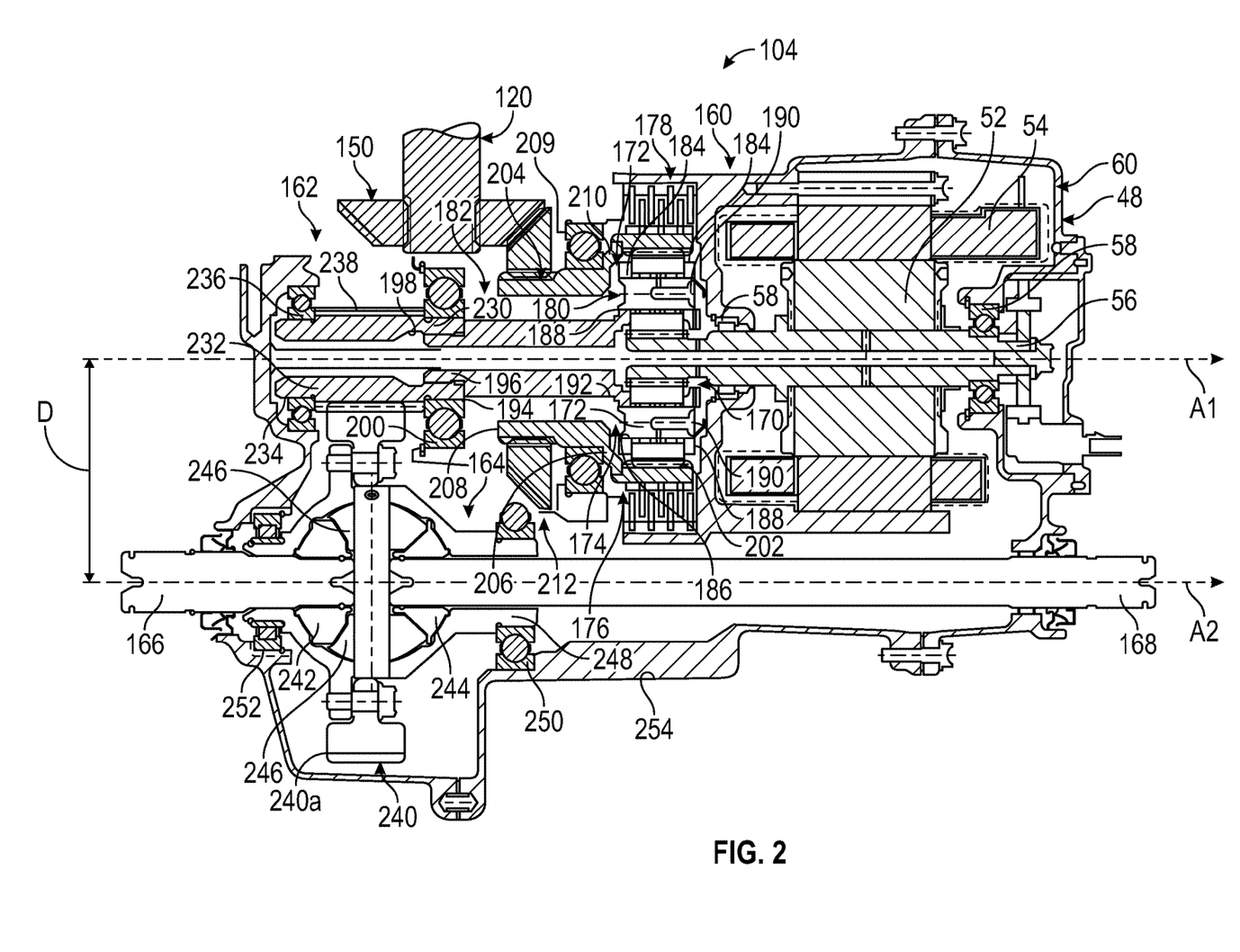
FIG. 2 is a cross-sectional view of an exemplary second or rear drive system of the all-wheel drive system of FIG. 1, in accordance with various embodiments.

With additional reference to FIG. 2, the propulsion system 20 may, in various embodiments, include an electric machine such as an electric motor or traction motor. In this example, the propulsion system 20 is an electric motor 48, which receives power from a power supply 50 associated with the vehicle 10. In one example, the power supply 50 includes one or more batteries and an inverter. The inverter converts DC power from the batteries to AC power to drive the electric motor 48. The electric motor 48 may have any suitable configuration for use with the vehicle 10. Briefly, the electric motor 48 includes a rotor 52, a stator 54 and an output shaft 56. In this example, the electric motor 48 is arranged or substantially symmetric relative to a motor axis A1. As shown in FIG. 1, the motor axis A1 is substantially transverse or perpendicular to a longitudinal axis L of the vehicle 10. The stator 54 surrounds the rotor 52 and includes two or more conductors that create a magnetic field to rotate the rotor 52. The rotor 52 includes one or more magnets or conductors, which also create a magnetic field. The output shaft 56 is coupled to the rotor 52 and rotates with the rotor 52. The output shaft 56 may be supported for rotation by one or more bearings 58. The electric motor 48 may be contained within a motor housing 60, and the output shaft 56 may extend outwardly from the motor housing 60. Generally, the bearings 58 are coupled to and retained by the motor housing 60.

In one example, the all-wheel drive system 100 includes a first or front drive system 102 and a second or rear drive system 104. As will be discussed, when both of the front drive system 102 and the rear drive system 104 cooperate together to drive the wheels 16, 18, the all-wheel drive system 100 is in all-wheel drive. When the front drive system 102 is disconnected from the rear drive system 104, such that the rear drive system 104 is driving just the wheels 18, the all-wheel drive system 100 is in two-wheel drive. Thus, the all-wheel drive system 100 is operable in both all-wheel drive and two-wheel drive. It should be noted that in all-wheel drive, the wheels 16, 18 are driven in the same direction.

With reference to FIG. 1, the front drive system 102 is shown. In one example, the front drive system 102 includes a first or front differential gear set 110, a first or front clutch 112, a pair of first or front axles or a first front axle 114 and a second front axle 116. The front differential gear set 110 is any suitable differential gear set. In one example, the front differential gear set 110 includes a front differential ring gear 122, a pair of side gears 124, 126 and a plurality of spider gears 128. The front differential ring gear 122 is a bevel gear, with a plurality of bevel gear teeth defined about an outer circumference of the front differential ring gear 122 along a first face 122a of the front differential ring gear 122. The front differential ring gear 122 is coupled to, engages with or is driven by a transfer pinion 118 of a prop-shaft 120. Generally, the side gears 124, 126 and the spider gears 128 are mounted for rotation within a differential housing 129, and the front clutch 112 connects or disconnects the front differential ring gear 122 from the differential housing 129.

In this regard, in a connected, first state, the front differential ring gear 122 is connected to the differential housing 129 and the front differential ring gear 122 is coupled to, engages with or drives the spider gears 128. In a disconnected, second state, the front differential ring gear 122 is disconnected from the differential housing 129, and the spider gears 128 and the side gears 124, 126 are each able to rotate with the differential housing 129, but the torque from the electric motor 48 is not transferred to the differential housing 129 to drive the front wheels 16. Stated another way, when the front differential ring gear 122 is in the disconnected, second state and disconnected from the differential housing 129 by the front clutch 112, the front wheels 16 are able to rotate or "free wheel" while the rear wheels 18 are driven by the rear drive system 104 in two-wheel drive.

It should be noted that in other embodiments, the front clutch 112 may be configured differently. In one example, the front clutch 112 may disconnect one of the first front axle 114 or the second front axle 116 in the disconnected, second state. For example, the front clutch 112 may disconnect the first front axle 114 from the first side gear 124, which allows the first side gear 124 to spin freely. With the first side gear 124 disconnected from the first front axle 114, the first side gear 124 rotates at a speed equal and opposite to the second side gear 126, and this combination of side gear speeds averages zero and allows the differential housing 129 to stop spinning thereby enabling the front wheels 16 to rotate while driven by the rear drive system 104.

With reference to FIG. 1, the front differential gear set 110 includes four spider gears 128, which are spaced apart by about 90 degrees and coupled for rotation within the differential housing 129. Each of the spider gears 128 is a bevel gear and includes a plurality of bevel gear teeth. Each of the spider gears 128 is coupled to, engages with or drives the side gears 124, 126. The side gears 124, 126 are each coupled to the differential housing 129. The side gears 124, 126 are each bevel gears, with a plurality of bevel gear teeth. The side gear 124 is coupled to the first front axle 114 to drive the first front axle 114, and thus, one of the front wheels 16. The side gear 126 is coupled to the second front axle 116 to drive the second front axle 116, and thus, the other one of the front wheels 16.

The front clutch 112 is any suitable clutch capable of disconnecting or connecting the front differential ring gear 122 from the differential housing 129. In one example, the front clutch 112 is a plate clutch, and includes at least a first plate 130, a second, pressure plate 132 and an actuation system 134. In the example of FIG. 1, the first plate 130 is coupled to a second face 122b of the front differential ring gear 122. The second face 122b is opposite the first face 122a. The pressure plate 132 is movable by the actuation system 134 to contact the first plate 130 and move the front differential ring gear 122 to the connected, first state and engage the front differential ring gear 122 with the differential housing 129. In one example, the actuation system 134 includes a hydraulic actuator 136, a control valve 138, at least one biasing member or spring 140 and a hydraulic fluid source 142. The hydraulic actuator 136 is coupled to the pressure plate 132, and is fluidly coupled to the control valve 138 via conduits, tubes, hoses, etc. The hydraulic actuator 136 is responsive to the hydraulic fluid (received from the control valve 138) to extend and to retract. The extension of the hydraulic actuator 136 moves the pressure plate 132 to connect the front differential ring gear 122 to the differential housing 129 in the connected, first state. The retraction of the hydraulic actuator 136 disconnects the front differential ring gear 122 from the differential housing 129 in the disconnected, second state. In this regard, the spring 140 biases the front differential ring gear 122 in the disconnected state. The spring 140 may be coupled between the front differential ring gear 122 and the differential housing 129 such that in the connected, first state, the hydraulic actuator 136 overcomes the spring force to connect or engage the front differential ring gear 122 with the differential housing 129. The spring 140 may be a leaf spring or any suitable biasing member. It should be noted that while the front clutch 112 is described as comprising a plate clutch, the front clutch 112 may also be a band clutch, a dog clutch, a lockable overrunning clutch, etc. In addition, it should be noted that while the actuation system 134 is described as including a hydraulic actuator, in other embodiments, the actuation system 134 may also comprise an electro-mechanical system including an electric motor, an actuator bearing and ball-ramp, etc.

The control valve 138 is fluidly coupled to the hydraulic actuator 136 and the source of hydraulic fluid source 142 via conduits, tubes, hoses, etc. The control valve 138 is generally a two-way valve, however, any valve may be employed. The control valve 138 is in communication with the controller 34 via a communication bus, for example, and is responsive to one or more control signals from the controller 34 to enable the flow of the hydraulic fluid to the hydraulic actuator 136 or to enable the flow of the hydraulic fluid from the hydraulic actuator 136 to the hydraulic fluid source 142. When the hydraulic fluid from the hydraulic fluid source 142 flows to the hydraulic actuator 136, the hydraulic actuator 136 extends to move the front differential ring gear 122 to the connected, first state. When the hydraulic fluid flows from the hydraulic actuator 136 to the hydraulic fluid source 142, the hydraulic actuator 136 retracts and the spring 140 moves the front differential ring gear 122 to the disconnected, second state.

In one example, the hydraulic fluid source 142 is a fluid tank that contains a predetermined amount of the hydraulic fluid. The hydraulic fluid source 142 may be positioned at any location on the vehicle 10, and the illustrated location is merely exemplary. The hydraulic fluid source 142 may also supply the hydraulic fluid to other systems associated with the vehicle 10.

The first front axle 114 is coupled to one of the front wheels 16, and the second front axle 116 is coupled to the other one of the front wheels 16. The first front axle 114 and the second front axle 116 may comprise any axle arrangement for transmitting torque from the side gears 124, 126 to the front wheels 16, and for receiving torque as the front wheels 16 are driven by the rear wheels 18 in two-wheel drive.

The transfer pinion 118 is coupled to the prop-shaft 120 to rotate with the prop-shaft 120. In one example, the transfer pinion 118 is a bevel gear that includes a plurality of bevel gear teeth, which are couped to, engage with or drive the front differential ring gear 122. The transfer pinion 118 is driven by the prop-shaft 120. The prop-shaft 120 interconnects the rear drive system 104 to the front drive system 102. The prop-shaft 120 is any shaft capable of transferring torque between the rear drive system 104 and the front drive system 102. The prop-shaft 120 includes the transfer pinion 118 at a first end and includes a transfer pinion 150 at a second end opposite the first end. In one example, the transfer pinion 150 includes a plurality of bevel gear teeth, which are coupled to, engage with or are driven by the rear drive system 104.

With reference to FIG. 2, the rear drive system 104 includes a planetary gear set 160, a second or rear drive shaft 162, a second or rear differential system 164, a pair of second or rear axles or a first rear axle 166 and a second rear axle 168. The electric motor 48, the planetary gear set 160 and the rear drive shaft 162 are axi-symmetric about the axis A1. In one example, the planetary gear set 160 includes a sun gear 170, a plurality of planet gears 172, a planet carrier 174, a ring gear 176 and a second or rear brake 178. The sun gear 170 includes a central bore, which is coupled about the output shaft 56 of the electric motor 48 such that the sun gear 170 is driven by the output shaft 56. The sun gear 170 is coupled to the output shaft 56 via swaging, for example. The sun gear 170 is a helical gear, with a plurality of helical gear teeth.

The planet gears 172 are coupled to, engage with or are driven by the sun gear 170. The planet gears 172 are each coupled to, engage with or drive the ring gear 176. In one example, the planetary gear set 160 includes four planet gears 172, however, the number of planet gears 172 may vary. The planet gears 172 are each a spur gear, with a plurality of straight gear teeth. Each of the planet gears 172 also defines a central bore and is coupled to the planet carrier 174 via the central bore.

The planet carrier 174 is coupled to each of the planet gears 172 and is also coupled to the rear drive shaft 162. In one example, the planet carrier 174 includes a carrier portion 180 and a carrier shaft 182. The carrier portion 180 includes a pair of spaced apart annular flanges 184. The flanges 184 are interconnected axially by segments or bridges that are spaced apart about the perimeter of the flanges 184 to define a plurality of gear receiving openings 186. Each of the flanges 184 defines a plurality of bores 188, with each bore 188 of each flange 184 coaxially aligned with a respective one of the gear receiving openings 186. A respective one of the planet gears 172 is coupled to a respective one of the gear receiving openings 186 such that the bores 188 are coaxially aligned with the central bore of the respective planet gear 172. A pin 190 may be swaged into one of the bores 188 and extend into the central bore of the planet gear 172 to couple the respective planet gear 172 to the planet carrier 174.

The carrier shaft 182 extends axially from the carrier portion 180. The carrier shaft 182 is integrally formed with the carrier portion 180 at a first end 192, which is opposite a second end 194. A central bore extends through the carrier shaft 182 from the first end 192 to the second end 194. At the second end 194, the carrier shaft 182 includes a coupling flange 196. The coupling flange 196 extends axially from the second end 194 and is received within a counterbore 198 of the rear drive shaft 162 to couple the rear drive shaft 162 to the carrier shaft 182. In one example, the coupling flange 196 is coupled to the counterbore 198 of the rear drive shaft 162 via swaging, however, other techniques may be employed. A bearing 200, such as a ball bearing, may be used to support the carrier shaft 182 and the rear drive shaft 162 for rotation.

The ring gear 176 is positioned about the planet gears 172. The ring gear 176 defines an inner bore 202, which includes a plurality of helical gear teeth. The ring gear 176 is coupled to, engages with or is driven by the planet gears 172, and generally rotates in a direction opposite the direction of rotation of the planet gears 172. In this example, the ring gear 176 also includes a ring carrier 204. The ring carrier 204 is substantially hollow and includes a first end 206 opposite a second end 208. A bearing 209, such as a ball bearing, may be used to support the ring carrier 204 for rotation. The first end 206 includes a ring coupling flange 210. The ring coupling flange 210 extends radially outward from the first end 206 and is coupled to the inner bore 202 of the ring gear 176 proximate the plurality of gear teeth. The ring coupling flange 210 is coupled to the ring gear 176 such that the ring carrier 204 rotates with the ring gear 176 at substantially the same speed as the ring gear 176. The second end 208 is coupled to a drive gear 212. In one example, the pitch diameter of the ring gear 176 has a ratio of about five to about two to the pitch diameter of the sun gear 170. The difference in the gear ratio between the ring gear 176 and the sun gear 170 results in the rear differential system 164 receiving a larger torque than the front differential gear set 110. The difference between the effective ratios of the ring gear 176 and the ring carrier 204 results in the rear torque being larger regardless of the ratio of the ring gear 176 to the sun gear 170. This difference in effective ratios also makes the step between the two-wheel drive and the all-wheel drive ratios less than two to one, for example, about 1.7, which limits the inertial energy involved in shifting between two-wheel drive and all-wheel drive, thereby improving an efficiency of the all-wheel drive system 100.

The drive gear 212 includes a central bore, which is coupled about an outer circumference of the second end 208, via swaging, for example. The drive gear 212 is driven by the ring gear 176. The drive gear 212 is a bevel gear and includes a plurality of bevel gear teeth defined about an outer perimeter of the drive gear. The drive gear 212 is coupled to, engages with or drives the transfer pinion 150. Generally, the drive gear 212 and the transfer pinion 150 are arranged at about a 90-degree angle relative to each other or comprise a right-angle drive.

The rear brake 178 is coupled to or fixed to an inner bore 220 defined in the motor housing 60 so as to surround the ring gear 176. The rear brake 178 comprises any suitable brake, and in one example, is an electronic brake. In one example, the rear brake 178 is in communication with the controller 34 via a communication bus, for example, and is responsive to one or more control signals from the controller 34 to activate. When activated, the rear brake 178 is configured to apply torque to the ring gear 176 to inhibit a rotation of the ring gear 176. Stated another way, the rear brake 178 is configured to apply a braking force to inhibit a rotation of the ring gear 176 such that the ring gear 176 remains stationary and torque is not transferred to the prop-shaft 120. It should be noted that the rear brake 178 may comprise a plate clutch, a band clutch, a dog clutch, etc.

The rear drive shaft 162 is coupled to the planet carrier 174 for rotation with the planet carrier 174. The rear drive shaft 162 includes a central bore and defines the counterbore 198 at a first end 230. A second end 232 is opposite the first end 230. The second end 232 includes a collar 234. The collar 234 is sized to receive a bearing 236, which supports the second end 232 of the rear drive shaft 162 for rotation. Between the first end 230 and the second end 232, the rear drive shaft 162 defines a gear 238. The gear 238 is integrally formed on the rear drive shaft 162 as a plurality of gear teeth. In this example, the plurality of gear teeth of the gear 238 are substantially straight gear teeth, but the plurality of gear teeth may also be helical. The gear 238 is coupled to, engages with or drives the rear differential system 164.

The rear differential system 164 transfers the torque from the electric motor 48 to the rear wheels 18. In one example, the rear differential system 164 includes a rear differential ring gear 240, a pair of rear side gears 242, 244 and a plurality of rear spider gears 246. The rear differential ring gear 240 is a helical gear, with a plurality of helical gear teeth defined about an outer circumference 240a of the rear differential ring gear 240. The rear differential ring gear 240 is coupled to, engages with or is driven by the gear 238 defined on the rear drive shaft 162. Generally, the rear side gears 242, 244 and the rear spider gears 246 are mounted for rotation within a differential housing 248.

In one example, the rear differential system 164 includes four rear spider gears 246, which are spaced apart by about 90 degrees and coupled for rotation within the differential housing 248. Each of the rear spider gears 246 is a bevel gear and includes a plurality of bevel gear teeth. Each of the rear spider gears 246 is coupled to, engages with or drives the rear side gears 242, 244. The rear side gears 242, 244 are each coupled to the differential housing 248. The rear side gears 242, 244 are each bevel gears, with a plurality of bevel gear teeth. The rear side gear 242 is coupled to the first rear axle 166 to drive the first rear axle 166, and thus, one of the rear wheels 18. The rear side gear 244 is coupled to the second rear axle 168 to drive the second rear axle 168, and thus, the other one of the rear wheels 18.

The first rear axle 166 is coupled to one of the rear wheels 18, and the second rear axle 168 is coupled to the other one of the rear wheels 18. The first rear axle 166 and the second rear axle 168 may comprise any axle arrangement for transmitting torque from the rear side gears 242, 244 to the rear wheels 18. The first rear axle 166 and the second rear axle 168 each extend along an axis A2, which is substantially parallel to the axis A1 of the electric motor 48. By arranging the electric motor 48 along the axis A1, which is substantially parallel to the axis A2, the rear drive system 104 has improved efficiency as right-angle gearing is not necessary to transfer torque to the rear axles 166, 168.

The first rear axle 166 and the second rear axle 168 may be supported for rotation by bearings 250, 252. The bearings 250, 252 may comprise ball bearings, and may be coupled to an outer housing 254 associated with the rear drive system 104. The outer housing 254 may be coupled to the motor housing 60 and cooperate with the motor housing 60 to substantially enclose the electric motor 48 and a portion of the rear drive system 104. Generally, the axis A2 of the first rear axle 166 and the second rear axle 168 is spaced apart from the axis A1 of the electric motor 48 by a distance D, which reduces packaging associated with the rear drive system 104. In one example, the distance D is about 125 millimeters (mm) to about 135 millimeters (mm).

With reference to FIGS. 1 and 2, with the vehicle 10 assembled and the front drive system 102 coupled to the rear drive system 104 via the prop-shaft 120, in two-wheel drive, the controller 34 outputs one or more control signals to the rear brake 178 to activate and lock the position of the ring gear 176 relative to the motor housing 60. The controller 34 may output one or more control signals to the control valve 138 to drain the hydraulic fluid from the hydraulic actuator 136 to the hydraulic fluid source 142. Without hydraulic fluid acting on the hydraulic actuator 136, the front clutch 112 is in the second, disconnected state due to the spring force of the spring 140. The electric motor 48 receives power from the power supply 50 to rotate based on one or more control signals from the controller 34, for example. As the rotor 52 rotates, the output shaft 56 rotates. The rotation of the output shaft 56 drives the sun gear 170. The rotation of the sun gear 170 drives the planet gears 172, and thus, the carrier shaft 182, which is coupled to the carrier portion 180 that retains the planet gears 172. The rotation of the carrier shaft 182, in turn, drives the rear drive shaft 162. The rotation of the gear 238 formed on the rear drive shaft 162 drives the rear differential ring gear 240. The rotation of the rear differential ring gear 240, in turn, drives the rear spider gears 246. The rotation of the rear spider gears 246 drives the rear side gears 242, 244. The rotation of the rear side gears 242, 244 drives the first rear axle 166 and the second rear axle 168, respectively, to drive the rear wheels 18 to propel the vehicle 10. With the rear brake 178 activated, the ring gear 176 does not rotate, and no torque is transferred to the prop-shaft 120. With the front clutch 112 in the second, disconnected state, the front wheels 16 are able to rotate as the vehicle 10 is propelled by the rear wheels 18.

In all-wheel drive, the rear brake 178 is deactivated to enable the ring gear 176 to rotate relative to the motor housing 60. The controller 34 outputs one or more control signals to the control valve 138 to supply hydraulic fluid to the hydraulic actuator 136 to move the front clutch 112 to the first, connected state. In the first, connected state the front differential ring gear 122 is engaged with the differential housing 129 to drive the spider gears 128. The electric motor 48 receives power from the power supply 50 to rotate based on one or more control signals from the controller 34, for example. As the rotor 52 rotates, the output shaft 56 rotates. The rotation of the output shaft 56 drives the sun gear 170. The rotation of the sun gear 170 drives the planet gears 172, and thus, the carrier shaft 182, which is coupled to the carrier portion 180 that retains the planet gears 172. The rotation of the carrier shaft 182, in turn, drives the rear drive shaft 162. The rotation of the gear 238 formed on the rear drive shaft 162 drives the rear differential ring gear 240. The rotation of the rear differential ring gear 240, in turn, drives the rear spider gears 246. The rotation of the rear spider gears 246 drives the rear side gears 242, 244. The rotation of the rear side gears 242, 244 drives the first rear axle 166 and the second rear axle 168, respectively, to drive the rear wheels 18 to propel the vehicle 10.

The rotation of the planet gears 172 also drives the ring gear 176. The rotation of the ring gear 176 rotates the ring carrier 204, which in turn drives the drive gear 212. The rotation of the drive gear 212 drives the transfer pinion 150. The rotation of the transfer pinion 150, in turn, rotates the prop-shaft 120 and the transfer pinion 118. The rotation of the transfer pinion 118 drives the front differential ring gear 122. The rotation of the front differential ring gear 122 drives the spider gears 128, and the rotation of the spider gears 128 drives the side gears 124, 126. The rotation of the side gears 124, 126 drives the first front axle 114 and the second front axle 116, respectively, to drive the front wheels 16 to propel the vehicle 10.

It should be noted that in other embodiments, the rear drive system 104 and the prop-shaft 120 may be configured differently to transfer torque to the front drive system 102. For example, with reference to FIG. 3, a prop-shaft 302 and a rear drive system 304 are shown for use with the vehicle 10 of FIG. 1 to transfer torque to the front drive system 102 of FIG. 1. As the prop-shaft 302 and the rear drive system 304 include components that are the same or similar to components of the prop-shaft 120 and the rear drive system 104 discussed with regard to FIGS. 1 and 2, the same reference numerals will be used to denote the same or similar components.

Figure 3:
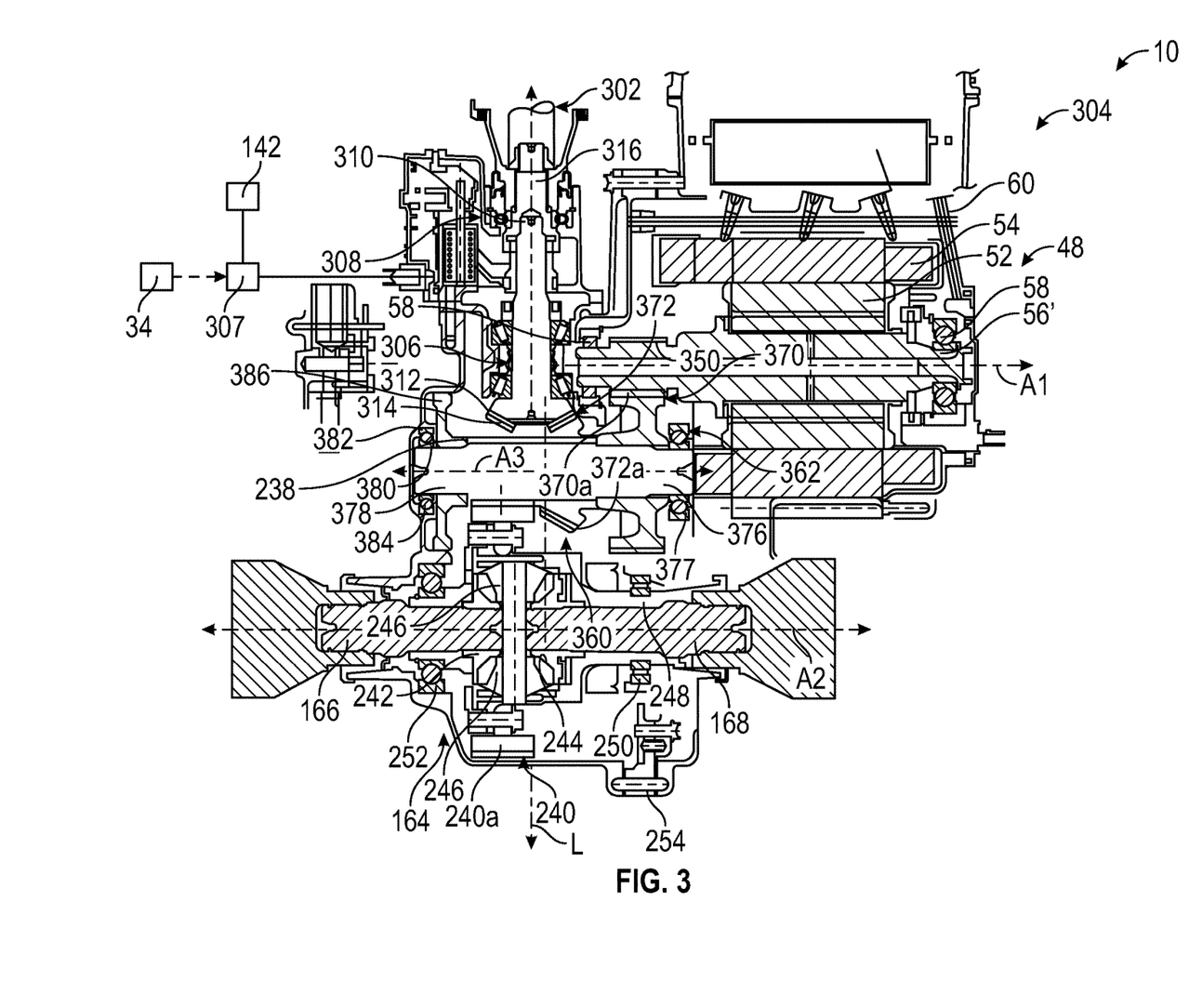
FIG. 3 is a cross-sectional view of another exemplary second or rear drive system of the all-wheel drive system of FIG. 1, in accordance with various embodiments.

In one example, the transfer pinion 118 (FIG. 1) is coupled to the prop-shaft 302 to rotate with the prop-shaft 302. The transfer pinion 118 is driven by the prop-shaft 302. The prop-shaft 302 interconnects the rear drive system 304 to the front drive system 102. The prop-shaft 302 is any shaft capable of transferring torque between the rear drive system 304 and the front drive system 102. The prop-shaft 302 includes the transfer pinion 118 at a first end and includes a transfer shaft 306 and a rear clutch 308 at a second end opposite the first end. In one example, the transfer shaft 306 includes a first shaft end 310 opposite a second shaft end 312. The first shaft end 310 is coupled to the rear clutch 308, and the second shaft end 312 defines a bevel gear 314. The bevel gear 314 has a plurality of bevel gear teeth, which are coupled to, engage with or driven by the rear drive system 304.

The rear clutch 308 couples or connects the transfer shaft 306 with the prop-shaft 302. In one example, the rear clutch 308 may be configured to include an intermediate shaft 316, which is received within and coupled to the second end of the prop-shaft 302, via swaging, for example. The use of the intermediate shaft 316 enables easier maintenance and assembly of the prop-shaft 302. The rear clutch 308 is coupled to the intermediate shaft 316 and the transfer shaft 306. The rear clutch 308 is in fluid communication with the hydraulic fluid source 142 (FIG. 1), and a control valve 307, like the control valve 138, may also be employed to control the flow of the hydraulic fluid to the rear clutch 308. Generally, the control valve 307 is a two-way valve, which is fluidly coupled to the hydraulic fluid source 142 and the rear clutch 308. The control valve 307 is in communication with the controller 34, via a communication bus, and is responsive to one or more control signals from the controller 34 to enable the hydraulic fluid to flow from the hydraulic fluid source 142 to the rear clutch 308 or to enable the hydraulic fluid to flow from the rear clutch 308 to the hydraulic fluid source 142. The rear clutch 308 in one example, includes, but is not limited to, a hydraulic dog clutch, which is responsive to hydraulic fluid from the hydraulic fluid source 142 to connect the transfer shaft 306 with the intermediate shaft 316 in a first state. In the first state, the transfer shaft 306 is connected to the intermediate shaft 316 via the rear clutch 308 such that the transfer shaft 306 rotates with or drives the intermediate shaft 316 to transfer torque to the front drive system 102 (FIG. 1). When the rear clutch 308 is disconnected in a second state, such that the hydraulic fluid flows from the rear clutch 308 to the hydraulic fluid source 142, the transfer shaft 306 rotates independently of the intermediate shaft 316. In the second state, the rear clutch 308 inhibits the transfer of torque from the rear drive system 304 to the front drive system 102 (FIG. 1).

The rear drive system 304 includes a gear set 360, a rear drive shaft 362, the rear differential system 164, the first rear axle 166 and the second rear axle 168. It should be noted that the electric motor 48 of FIGS. 1 and 2 may be used with the embodiment of FIG. 3, but the output shaft 56 of the electric motor 48 may be modified. In this regard, in the example of FIG. 3, the electric motor 48 includes an output shaft 56'. The output shaft 56' includes a gear 350, which is integrally formed or defined on the output shaft 56'. The electric motor 48 is axi-symmetric about the axis A1, and the gear set 360 and the rear drive shaft 362 are axi-symmetric about an axis A3. The axis A3 is offset from the axes A1, A2 and is substantially parallel to the axes A1, A2. The axis A3 is substantially perpendicular to the longitudinal axis L of the vehicle 10. In one example, the gear set 360 includes a first gear 370 and a second gear 372. The first gear 370 includes a central bore, which is coupled about the rear drive shaft 362 such that the first gear 370 is arranged substantially perpendicular to the axis A3. The first gear 370 is coupled to the rear drive shaft 362 via swaging, for example. The first gear 370 is a helical gear, with a plurality of helical gear teeth defined about an outer perimeter 370a of the first gear 370. The first gear 370 is coupled to, engages with or is driven by the gear 350 of the output shaft 56' such that the first gear 370 is driven by the output shaft 56'.

The second gear 372 includes a central bore, which is coupled about the rear drive shaft 362. The second gear 372 is coupled to the rear drive shaft 362 via swaging, for example. The second gear 372 is a bevel gear, with a plurality of bevel gear teeth defined about an outer perimeter 372a of the second gear 372. The second gear 372 is coupled to, engages with or drives the bevel gear 314 such that the second gear 372 drives the transfer shaft 306.

The rear drive shaft 362 is coupled to the first gear 370 and the second gear 372. In one example, the rear drive shaft 362 is a solid cylindrical shaft, with a first shaft end 376 opposite a second shaft end 378. The first gear 370 is coupled proximate the first shaft end 376, and the second gear 372 is coupled proximate the first shaft end 376 so as to be positioned directly adjacent to or next to the first gear 370. A bearing 377, such as a ball bearing, is coupled at the first shaft end 376 and supports the rear drive shaft 362 for rotation. The gear 238 is integrally formed or defined between the second gear 372 and the second shaft end 378 and has a plurality of helical gear teeth. The gear 238 is coupled to, engages with or drives the rear differential system 164. The second shaft end 378 includes a recessed portion 380. The recessed portion 380 is sized to receive a bearing 382, which supports the second shaft end 378 of the rear drive shaft 362 for rotation. The second shaft end 378 may also be integrally formed with or define a gear 384 with a plurality of helical gear teeth. The plurality of gear teeth of the gear 384 are coupled to or engaged with a park gear 386.

The rear differential system 164 transfers the torque from the electric motor 48 to the rear wheels 18. In one example, the rear differential system 164 includes the rear differential ring gear 240, the pair of rear side gears 242, 244 and the plurality of rear spider gears 246. The rear side gears 242, 244 and the rear spider gears 246 are mounted for rotation within the differential housing 248. Each of the rear spider gears 246 is coupled to, engages with or drives the rear side gears 242, 244. The rear side gear 242 is coupled to the first rear axle 166 to drive the first rear axle 166, and thus, one of the rear wheels 18. The rear side gear 244 is coupled to the second rear axle 168 to drive the second rear axle 168, and thus, the other one of the rear wheels 18. The first rear axle 166 and the second rear axle 168 each extend along the axis A2, which is substantially parallel to the axis A1 of the electric motor 48. By arranging the electric motor 48 along the axis A1, which is substantially parallel to the axis A2, the rear drive system 304 has improved efficiency as right-angle gearing is not necessary to transfer torque to the rear axles 166, 168.

With reference to FIGS. 1 and 3, with the vehicle 10 assembled and the front drive system 102 coupled to the rear drive system 304 via the prop-shaft 302, in two-wheel drive, the controller 34 may output one or more control signals to the control valve 138 to drain the hydraulic fluid from the hydraulic actuator 136 to the hydraulic fluid source 142. Without hydraulic fluid acting on the hydraulic actuator 136, the front clutch 112 is in the second, disconnected state due to the spring force of the spring 140. The controller 34 may output one or more control signals to the control valve 307 to drain the hydraulic fluid from the rear clutch 308 to the hydraulic fluid source 142 to move the rear clutch 308 to the second state and disconnect the prop-shaft 302 from the rear drive shaft 362.

The electric motor 48 receives power from the power supply 50 to rotate based on one or more control signals from the controller 34, for example. As the rotor 52 rotates, the output shaft 56' rotates. The rotation of the output shaft 56' drives the first gear 370. The rotation of the first gear 370 drives the rear drive shaft 362. The rotation of the rear drive shaft 362 drives the second gear 372, which is coupled to the transfer shaft 306. With the transfer shaft 306 disconnected from the prop-shaft 302 via the rear clutch 308, the transfer shaft 306 rotates without transferring torque to the front drive system 102. The rotation of the rear drive shaft 362 also drives the gear 238. The rotation of the gear 238 drives the rear differential ring gear 240. The rotation of the rear differential ring gear 240, in turn, drives the rear spider gears 246. The rotation of the rear spider gears 246 drives the rear side gears 242, 244. The rotation of the rear side gears 242, 244 drives the first rear axle 166 and the second rear axle 168, respectively, to drive the rear wheels 18 to propel the vehicle 10. With the front clutch 112 in the second, disconnected state, the front wheels 16 are able to rotate as the vehicle 10 is propelled by the rear wheels 18.

In all-wheel drive, the controller 34 outputs one or more control signals to the control valve 307 to supply hydraulic fluid to the rear clutch 308 to move the rear clutch 308 to connect the transfer shaft 306 to the intermediate shaft 316 in the first state. The controller 34 outputs one or more control signals to the control valve 138 to supply hydraulic fluid to the hydraulic actuator 136 to move the front clutch 112 to the first, connected state. In the first, connected state the front differential ring gear 122 is engaged with the differential housing 129 to drive the spider gears 128. The electric motor 48 receives power from the power supply 50 to rotate based on one or more control signals from the controller 34, for example. As the rotor 52 rotates, the output shaft 56' rotates. The rotation of the output shaft 56' drives the first gear 370. The rotation of the first gear 370 drives the rear drive shaft 362. The rotation of the rear drive shaft 362 drives the gear 238. The rotation of the gear 238 drives the rear differential ring gear 240. The rotation of the rear differential ring gear 240, in turn, drives the rear spider gears 246. The rotation of the rear spider gears 246 drives the rear side gears 242, 244. The rotation of the rear side gears 242, 244 drives the first rear axle 166 and the second rear axle 168, respectively, to drive the rear wheels 18 to propel the vehicle 10.

The rotation of the rear drive shaft 362 also drives the second gear 372, which is coupled to the transfer shaft 306. With the transfer shaft 306 connected to the prop-shaft 302 via the rear clutch 308, the transfer shaft 306 drives the prop-shaft 302 to transfer torque to the front drive system 102. The rotation of the prop-shaft 302 drives the transfer pinion 118. The rotation of the transfer pinion 118 drives the front differential ring gear 122. The rotation of the front differential ring gear 122 drives the spider gears 128, and the rotation of the spider gears 128 drives the side gears 124, 126. The rotation of the side gears 124, 126 drives the first front axle 114 and the second front axle 116, respectively, to drive the front wheels 16 to propel the vehicle 10.

It should be noted that in other embodiments, the rear drive system 104 and the prop-shaft 120 may be configured differently to transfer torque to the front drive system 102. For example, with reference to FIG. 4, a prop-shaft 402 and a rear drive system 404 are shown for use with the vehicle 10 of FIG. 1 to transfer torque to the front drive system 102 of FIG. 1. As the prop-shaft 402 and the rear drive system 404 include components that are the same or similar to components of the prop-shaft 120 and the rear drive system 104 discussed with regard to FIGS. 1 and 2, and the prop-shaft 302 and the rear drive system 304 of FIG. 3, the same reference numerals will be used to denote the same or similar components.

Figure 4:
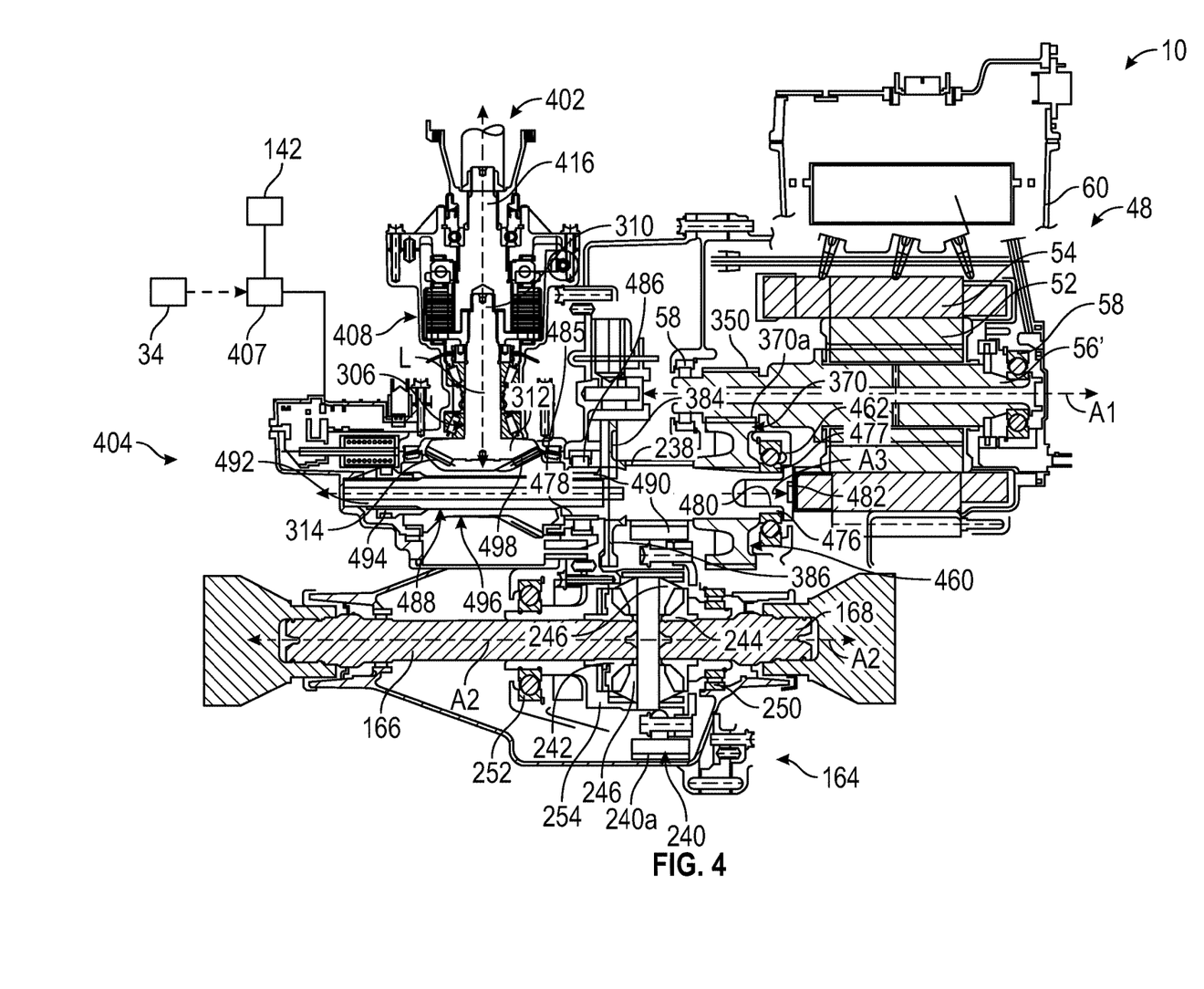
FIG. 4 is a cross-sectional view of yet another exemplary second or rear drive system of the all-wheel drive system of FIG. 1, in accordance with various embodiments.

In one example, the transfer pinion 118 (FIG. 1) is coupled to the prop-shaft 402 to rotate with the prop-shaft 402. The transfer pinion 118 is driven by the prop-shaft 402. The prop-shaft 402 interconnects the rear drive system 404 to the front drive system 102. The prop-shaft 402 is any shaft capable of transferring torque between the rear drive system 404 and the front drive system 102. The prop-shaft 402 includes the transfer pinion 118 at a first end and includes the transfer shaft 306 and a rear clutch 408 at a second end opposite the first end. The first shaft end 310 is coupled to the rear clutch 408, and the second shaft end 312 defines the bevel gear 314. The bevel gear 314 has the plurality of bevel gear teeth, which are coupled to, engage with or driven by the rear drive system 404.

The rear clutch 408 couples or connects the transfer shaft 306 with the prop-shaft 402. In one example, the rear clutch 408 may be configured to include an intermediate shaft 416, which is received within and coupled to the second end of the prop-shaft 402, via swaging, for example. The use of the intermediate shaft 416 enables easier maintenance and assembly of the prop-shaft 402. The rear clutch 408 is coupled to the intermediate shaft 416 and the transfer shaft 306. The rear clutch 408 is in fluid communication with the hydraulic fluid source 142 (FIG. 1), and a control valve 407 may also be employed to control the flow of the hydraulic fluid to the rear clutch 408. Generally, the control valve 407 is a two-way valve, which is fluidly coupled to the hydraulic fluid source 142 and the rear clutch 408. The control valve 407 is in communication with the controller 34, via a communication bus, and responsive to one or more control signals from the controller 34 to enable the hydraulic fluid to flow from the hydraulic fluid source 142 to the rear clutch 408 or to enable the hydraulic fluid to flow from the rear clutch 408 to the hydraulic fluid source 142. The rear clutch 408 in one example, includes, but is not limited to, a hydraulic plate clutch, which is responsive to hydraulic fluid from the hydraulic fluid source 142 to connect the transfer shaft 306 with the intermediate shaft 416 in a first state. In the first state, the transfer shaft 306 is connected to the intermediate shaft 416 via the rear clutch 408 such that the transfer shaft 306 rotates with or drives the intermediate shaft 416 to transfer torque to the front drive system 102 (FIG. 1). When the rear clutch 408 is disconnected in a second state, such that the hydraulic fluid flows from the rear clutch 408 to the hydraulic fluid source 142, the transfer shaft 306 rotates independently of the intermediate shaft 416. In the second state, the rear clutch 408 inhibits the transfer of torque from the rear drive system 404 to the front drive system 102 (FIG. 1).

The rear drive system 404 includes a gear set 460, a rear drive shaft 462, the rear differential system 164, the first rear axle 166 and the second rear axle 168. It should be noted that the electric motor 48 of FIGS. 1 and 2 may be used with the embodiment of FIG. 4, but the output shaft 56 of the electric motor 48 may be modified. In this regard, the electric motor 48 includes the output shaft 56'. The electric motor 48 is axi-symmetric about the axis A1, and the gear set 460 and the rear drive shaft 462 are axi-symmetric about an axis A3. The axis A3 is offset from the axes A1, A2 and is substantially parallel to the axes A1, A2. The axis A3 is substantially perpendicular to the longitudinal axis L of the vehicle 10. In one example, the gear set 460 includes the first gear 370. The first gear 370 includes a central bore, which is coupled about the rear drive shaft 462. The first gear 370 is coupled to the rear drive shaft 462 via swaging, for example. The first gear 370 is coupled to, engages with or is driven by the gear 350 of the output shaft 56' such that the first gear 370 is driven by the output shaft 56'.

The rear drive shaft 462 is coupled to the first gear 370 and is driven by the first gear 370. In one example, the rear drive shaft 462 is a solid cylindrical shaft, with a first shaft end 476 opposite a second shaft end 478. The first gear 370 is coupled proximate the first shaft end 476. A bearing 477, such as a ball bearing, is coupled at the first shaft end 476 and supports the rear drive shaft 462 for rotation. The first shaft end 476 may also include a counterbore 480, which receives a pin 482 to assist in coupling the bearing 477 to the first shaft end 476. The gear 238 is integrally formed or defined between the first gear 370 and the second shaft end 478. The gear 238 is coupled to, engages with or drives the rear differential system 164. The second shaft end 478 includes a recessed portion 484 and a second counterbore 485. The recessed portion 484 is sized to receive a bearing 486, which supports the second shaft end 478 of the rear drive shaft 462 for rotation. The second shaft end 478 may also be integrally formed with or define the gear 384 with a plurality of helical gear teeth. The plurality of gear teeth of the gear 384 are coupled to or engaged with the park gear 386. The second counterbore 485 receives a portion of a second rear drive shaft 488.

The second rear drive shaft 488 transfers the torque from the rear drive shaft 462 to the transfer shaft 306 when the rear clutch 408 is in the first state. The second rear drive shaft 488 includes a first end 490 opposite a second end 492. The first end 490 is received within the second counterbore 485 to couple the second rear drive shaft 488 for rotation with the rear drive shaft 462. The second end 492 is coupled to a bushing 494, which supports the rotation of the second rear drive shaft 488 for rotation. A sleeve 496 is positioned between the first end 490 and the second end 492 and has an inner bore that surrounds the second rear drive shaft 488. The sleeve 496 is coupled to the second rear drive shaft 488 to rotate with the second rear drive shaft 488 at substantially the same speed as the second rear drive shaft 488. The sleeve 496 is integrally formed with or defines a gear 498 near a first end of the sleeve 496 about an outer perimeter of the sleeve 496, which includes a plurality of helical gear teeth. The gear 498 is coupled to, engages with or drives the bevel gear 314 of the transfer shaft 306 to transfer torque to the front drive system 102 (FIG. 1).

The rear differential system 164 transfers the torque from the electric motor 48 to the rear wheels 18. In one example, the rear differential system 164 includes the rear differential ring gear 240, the pair of rear side gears 242, 244 and the plurality of rear spider gears 246. The rear side gears 242, 244 and the rear spider gears 246 are mounted for rotation within the differential housing 248. Each of the rear spider gears 246 is coupled to, engages with or drives the rear side gears 242, 244. The rear side gear 242 is coupled to the first rear axle 166 to drive the first rear axle 166, and thus, one of the rear wheels 18. The rear side gear 244 is coupled to the second rear axle 168 to drive the second rear axle 168, and thus, the other one of the rear wheels 18. The first rear axle 166 and the second rear axle 168 each extend along the axis A2, which is substantially parallel to the axis A1 of the electric motor 48. By arranging the electric motor 48 along the axis A1, which is substantially parallel to the axis A2, the rear drive system 304 has improved efficiency as right-angle gearing is not necessary to transfer torque to the rear axles 166, 168.

With reference to FIGS. 1 and 4, with the vehicle 10 assembled and the front drive system 102 coupled to the rear drive system 404 via the prop-shaft 402, in two-wheel drive, the controller 34 may output one or more control signals to the control valve 138 to drain the hydraulic fluid from the hydraulic actuator 136 to the hydraulic fluid source 142. Without hydraulic fluid acting on the hydraulic actuator 136, the front clutch 112 is in the second, disconnected state due to the spring force of the spring 140. The controller 34 may output one or more control signals to the control valve 407 to drain the hydraulic fluid from the rear clutch 408 to the hydraulic fluid source 142 to move the rear clutch 408 to the second state and disconnect the prop-shaft 402 from the rear drive shaft 462.

The electric motor 48 receives power from the power supply 50 to rotate based on one or more control signals from the controller 34, for example. As the rotor 52 rotates, the output shaft 56' rotates. The rotation of the output shaft 56' drives the first gear 370. The rotation of the first gear 370 drives the rear drive shaft 462. The rotation of the rear drive shaft 462 drives the gear 238 and the second rear drive shaft 488. With the transfer shaft 306 disconnected from the prop-shaft 302 via the rear clutch 408, the rotation of the second rear drive shaft 488 drives the transfer shaft 306 without transferring torque to the front drive system 102. The rotation of the gear 238 drives the rear differential ring gear 240. The rotation of the rear differential ring gear 240, in turn, drives the rear spider gears 246. The rotation of the rear spider gears 246 drives the rear side gears 242, 244. The rotation of the rear side gears 242, 244 drives the first rear axle 166 and the second rear axle 168, respectively, to drive the rear wheels 18 to propel the vehicle 10. With the front clutch 112 in the second, disconnected state, the front wheels 16 are able to rotate as the vehicle 10 is propelled by the rear wheels 18.

In all-wheel drive, the controller 34 outputs one or more control signals to the control valve 407 to supply hydraulic fluid to the rear clutch 408 to move the rear clutch 408 to connect the transfer shaft 306 to the intermediate shaft 416. The controller 34 outputs one or more control signals to the control valve 138 to supply hydraulic fluid to the hydraulic actuator 136 to move the front clutch 112 to the first, connected state. In the first, connected state the front differential ring gear 122 is engaged with the differential housing 129 to drive the spider gears 128. The electric motor 48 receives power from the power supply 50 to rotate based on one or more control signals from the controller 34, for example. As the rotor 52 rotates, the output shaft 56' rotates. The rotation of the output shaft 56' drives the first gear 370. The rotation of the first gear 370 drives the rear drive shaft 462. The rotation of the rear drive shaft 462 drives the gear 238 and the second rear drive shaft 488. The rotation of the gear 238 drives the rear differential ring gear 240. The rotation of the rear differential ring gear 240, in turn, drives the rear spider gears 246. The rotation of the rear spider gears 246 drives the rear side gears 242, 244. The rotation of the rear side gears 242, 244 drives the first rear axle 166 and the second rear axle 168, respectively, to drive the rear wheels 18 to propel the vehicle 10.

The rotation of the rear drive shaft 362 also drives the second rear drive shaft 488, which is coupled to the transfer shaft 306 via the gear 498 of the sleeve 496. With the transfer shaft 306 connected to the prop-shaft 402 via the rear clutch 408, the transfer shaft 306 drives the prop-shaft 402 to transfer torque to the front drive system 102. The rotation of the prop-shaft 402 drives the transfer pinion 118. The rotation of the transfer pinion 118 drives the front differential ring gear 122. The rotation of the front differential ring gear 122 drives the spider gears 128, and the rotation of the spider gears 128 drives the side gears 124, 126. The rotation of the side gears 124, 126 drives the first front axle 114 and the second front axle 116, respectively, to drive the front wheels 16 to propel the vehicle 10.

Thus, the front drive system 102 and the rear drive system 104, 304, 404 enable the operation of the vehicle 10 in both two-wheel and all-wheel drive. In two-wheel drive, the rear drive system 104, 304, 404 has improved efficiency, as the electric motor 48 and the rear differential system 164 are coupled together along the axes A1, A2, A3, respectively, which are substantially parallel. Stated another way, due to the arrangement of the electric motor 48, the rear drive shaft 162, 362, 462 and the rear differential system 164 along substantially parallel axes, a right-angle drive is not necessary in two-wheel drive, which improves the efficiency of torque transfer from the electric motor 48 to the rear drive shaft 162, 362, 462 and the rear differential system 164. The improved torque transfer may extend the range of the vehicle 10 or may enable a reduction in capacity of the batteries associated with the power supply 50. Generally, a right-angle drive is about 2% to 3% less efficient than a gear arrangement on parallel axes. In addition, the arrangement of the rear drive shaft 162 and the rear differential system 164 provides for improved packaging as the distance D between the axes A1, A2 is reduced. Also, the use of the front clutch 112 enables the front wheels 16 to rotate freely in instances where the prop-shaft 120, 302, 402 is inhibited from rotating. It should also be noted that the bevel gears described herein as having bevel gear teeth may also have spiral cut teeth or hypoid cut teeth, if desired.

The combination of the front drive system 102 and the rear drive system 104, 304, 404 also allows the operation of the vehicle 10 in all-wheel drive at a first ratio between the output shaft 56 of the electric motor 48 and the driven wheels 18 and 16, and in two-wheel drive at a second ratio between the output shaft 56 of the electric motor 48 and the driven wheels 18. The first ratio is about 1.7 times the second ratio or the step between the two ratios is about 1.7. In this example, the ratio of the ring gear 176 of the planetary gear set 160 to the sun gear 170 is about 2 to about 5, and in one example, is about 4.3. The rear differential system 164 ratio to the sun gear 170 is about 2.3. The final drive ratio in all-wheel drive is about 22.1, and the final drive ratio in two-wheel drive is about 12.2. The lower final drive ratio for two-wheel drive is advantageous as it enables the rear wheels 18 to be driven by the electric motor 48 more efficiently, which also improves the range of the vehicle 10.

Thus, the all-wheel drive system 100 provides the vehicle 10 with all-wheel drive having sufficient torque to reach the traction limits of all wheels 16, 18 for driving at lower vehicle speeds and with efficient parallel-axis two-wheel drive with sufficient torque to reach the traction limits for those two wheels for driving at higher vehicle speeds. In addition, the minimum amount of gearing provided by the front drive system 102 and the rear drive system 104 improves efficiency of the front drive system 102 and the rear drive system 104, which increases the range of the vehicle 10. Furthermore, a single shifting operation using the rear brake 178 and the front clutch 112 affects the change from all-wheel drive to two-wheel drive. If the front clutch 112 is a lockable overrunning clutch, with the front clutch 112 in its second, disconnected state shifting operations are easy and user friendly to execute during forward drive by "lifting off" an overrunning clutch to shift from all-wheel drive at the first ratio to two-wheel drive at the second ratio and "landing on" an overrunning clutch to shift from two-wheel drive at the second ratio to all-wheel drive at the first ratio.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An all-wheel drive system for a vehicle having a longitudinal axis, comprising:
    an electric motor configured to generate torque, the electric motor having an output shaft that extends along a first axis, the first axis substantially perpendicular to the longitudinal axis;
    a first drive system including a first clutch and a first differential system configured to be coupled to a second drive system and to transfer the torque to first wheels of the vehicle in a first state of the first clutch; and
    the second drive system including a second drive shaft and a second differential system, the second drive shaft coupled to the output shaft and configured to transfer the torque to the second differential system, the second differential system configured to transfer the torque to second wheels of the vehicle, the second differential system extending along a second axis substantially parallel to the first axis, wherein the second drive shaft is coaxial with the output shaft and defines a gear that is coupled to a ring gear of the second differential system.

2. The all-wheel drive system of claim 1, wherein the second drive shaft is coupled to the output shaft via a planetary gear set.

3. The all-wheel drive system of claim 2, wherein the planetary gear set includes a sun gear coupled to the output shaft, a plurality of planet gears coupled to a planet carrier and the ring gear, and the planet carrier is coupled to the second drive shaft.

4. The all-wheel drive system of claim 3, wherein the ring gear is coupled to a ring carrier and a brake, and the brake is configured to lock the ring gear relative to a motor housing associated with the electric motor.

5. The all-wheel drive system of claim 4, wherein the ring carrier includes a bevel gear, the bevel gear is configured to couple to a first transfer pinion of a prop-shaft and the prop-shaft is configured to couple the second drive system to the first drive system.

6. The all-wheel drive system of claim 2, wherein the second drive shaft extends along the first axis.

7. The all-wheel drive system of claim 1, wherein the second drive shaft extends along a third axis, which is parallel to the first axis and the second axis.

8. The all-wheel drive system of claim 7, wherein the output shaft is coupled to the second drive shaft by the gear that is arranged substantially perpendicular to the third axis.

9. The all-wheel drive system of claim 7, wherein the second drive shaft is configured to be coupled to the first drive system via a second clutch.

10. The all-wheel drive system of claim 1, wherein the first clutch comprises a lockable overrunning clutch configured to permit rotation of a first differential ring gear in a forward direction while preventing reverse rotation when in a disconnected state.

11. The all-wheel drive system of claim 1, wherein the first differential system includes a first differential ring gear and a differential housing that includes a plurality of spider gears that are configured to drive a pair of side gears, each side gear coupled to a respective first axle, and the first clutch is coupled to the first differential ring gear and is configured to connect the first differential ring gear with the differential housing in the first state.

12. The all-wheel drive system of claim 11, wherein in a second state, the first clutch is configured to disconnect the first differential ring gear from the differential housing.

13. A vehicle having a longitudinal axis, comprising:
    an electric motor configured to generate torque, the electric motor having an output shaft that extends along a first axis, the first axis substantially perpendicular to the longitudinal axis;
    a rear drive system including a rear drive shaft and a rear differential system, the rear drive shaft coupled to the output shaft with a planetary gear set and configured to transfer the torque to the rear differential system, the rear differential system configured to transfer the torque to rear wheels of the vehicle, the rear differential system extending along a second axis substantially parallel to the first axis; and
    a front drive system including a front clutch and a front differential system configured to be coupled to the rear drive system and to transfer the torque to front wheels of the vehicle in a first state of the front clutch, and wherein the rear drive shaft is coaxial with the output shaft and defines a gear that is coupled to a ring gear of the rear differential system.

14. The vehicle of claim 13, wherein the planetary gear set includes a sun gear coupled to the output shaft, a plurality of planet gears coupled to a planet carrier and the ring gear, and the planet carrier is coupled to the rear drive shaft.

15. The vehicle of claim 14, wherein the ring gear is coupled to a ring carrier and a brake, and the brake is configured to lock the ring gear relative to a motor housing associated with the electric motor.

16. The vehicle of claim 15, wherein the ring carrier includes a bevel gear, and the bevel gear is configured to couple to a first transfer pinion of a prop-shaft, and the prop-shaft is configured to couple the rear drive system to the front drive system.

17. The vehicle of claim 13, wherein the front clutch is a hydraulic dog clutch responsive to a control signal from a controller to transition between a connected state and a disconnected state.

18. The vehicle of claim 13, wherein the front differential system includes a front differential ring gear and a differential housing that includes a plurality of spider gears that are configured to drive a pair of side gears, each side gear coupled to a respective front axle, and the front clutch is coupled to the front differential ring gear and is configured to connect the front differential ring gear with the differential housing in the first state.

19. The vehicle of claim 18, wherein in a second state, the front clutch is configured to disconnect the front differential ring gear from the differential housing.

20. The vehicle of claim 13, wherein the rear drive shaft extends along the first axis.

* * * * *